US012801470B2

(12) United States Patent
Tsai

(10) Patent No.: US 12,801,470 B2
(45) Date of Patent: Nov. 17, 2026

(54) METHOD OF RECORDING ERROR EVENT

(71) Applicant: Mitac Computing Technology Corporation, Taoyuan City (TW)

(72) Inventor: Wen-Ching Tsai, Taoyuan City (TW)

(73) Assignee: Mitac Computing Technology Corporation, Taoyuan City (TW)

( * ) Notice: Subject to any disclaimer, the term of this patent is extended or adjusted under 35 U.S.C. 154(b) by 12 days.

(21) Appl. No.: 19/033,859

(22) Filed: Jan. 22, 2025

(65) Prior Publication Data

US 2025/0315329 A1 Oct. 9, 2025

(30) Foreign Application Priority Data

Apr. 8, 2024 (TW) ................................ 113112890

(51) Int. Cl.
*G06F 11/07* (2006.01)

(52) U.S. Cl.
CPC ........ *G06F 11/076* (2013.01); *G06F 11/0772* (2013.01); *G06F 11/0784* (2013.01)

(58) Field of Classification Search
CPC . G06F 11/076; G06F 11/0772; G06F 11/0784
See application file for complete search history.

(56) References Cited

U.S. PATENT DOCUMENTS

2017/0111215 A1* 4/2017 Chou .................. G06F 11/3409
2020/0111539 A1* 4/2020 Yamaguchi ......... G06F 11/3062
2024/0241805 A1* 7/2024 Xu ...................... G06F 11/1048

FOREIGN PATENT DOCUMENTS

CN 116361093 A 6/2023
CN 116820828 A * 9/2023 .......... G06F 11/0757
CN 117785521 A * 3/2024 .......... G06F 11/2284

OTHER PUBLICATIONS

Search Report appended to an Office Action, which was issued to Taiwanese counterpart application No. 113112890 by the TIPO on Oct. 30, 2024, with an English translation thereof.

* cited by examiner

*Primary Examiner* — Marc Duncan
*Assistant Examiner* — Audrey Emma Whitesell
(74) *Attorney, Agent, or Firm* — MLO, a professional corp.

(57) ABSTRACT

A method of recording error event is implemented by a processing module in connection to a BMC, the method includes steps of: when a correctable error has occurred in a hardware module, obtaining a current error frequency related to occurrence of the correctable error, and generating error event data related to the correctable error; when the current error frequency is greater than a first threshold, adjusting a notification upper limit corresponding to the hardware module from a default value to an alternative value; increasing an error count value by one; when the error count value has not reached the notification upper limit, returning to the step of obtaining the current error frequency; and when the error count value has reached the notification upper limit, sending the error event data to the BMC, setting the error count value to zero, and returning to the step of obtaining the current error frequency.

12 Claims, 5 Drawing Sheets correctable error detected in hardware correctable error detected in hardware reporting per 10 error correctable error detected in hardware correctable error detected in hardware correctable error detected in hardware reporting per 1 error correctable error detected in hardware

FIG. 3

METHOD OF RECORDING ERROR EVENT

CROSS-REFERENCE TO RELATED APPLICATION

This application claims priority to Taiwanese Invention Patent Application No. 113112890, filed on Apr. 8, 2024, the entire disclosure of which is incorporated by reference herein.

FIELD

The disclosure relates to a method of recording an error event, and more particularly to a method of recording an error event related to an error occurred in a hardware of a server.

BACKGROUND

In a conventional server, an error event that can be detected with an error detection function of the conventional server is categorized as either a correctable error or an uncorrectable error. When a central processing unit (CPU) of the conventional server detects an error event occurred in a hardware, a system management interrupt (SMI) is triggered, and when it is determined that the error event is a correctable error, the CPU sends error event data related to the error event (e.g., a time of occurrence or a content of the error event) to a baseboard management controller (BMC) so that the BMC may record the error event data in a system event log.

When a large number of correctable errors are detected by the CPU within a short period of time, the SMI will be frequently triggered, thereby generating more error event data which will be sent to the BMC. In such a case, the performance of the conventional server may be degraded, and the conventional server may even crash. To prevent this from happening, the conventional server is configured to control the CPU to temporarily pause the generation of the error event data, and as a result, the BMC stops recording the error event data during the pause. However, even though this mechanism may prevent the conventional server from crashing due to excessive error event data, any hardware errors that occur during the pause are not recorded.

SUMMARY

Therefore, an object of the disclosure is to provide a method of recording an error event that can alleviate at least one of the drawbacks of the prior art.

According to the disclosure, the method of recording an error event is implemented by a processing module that is electrically connected to a hardware module and a baseboard management controller (BMC). The method includes steps of: A) in response to determining that a correctable error has occurred in the hardware module, obtaining a current error frequency related to occurrence of the correctable error in the hardware module, and generating error event data that is related to the correctable error; B) after step A), determining whether the current error frequency is greater than a first threshold; C) after step B), in response to determining that the current error frequency is greater than the first threshold, adjusting a notification upper limit that corresponds to the hardware module from a default value to an alternative value, where the alternative value is greater than the default value; D) after step C), increasing an error count value by one, where the error count value indicates a number of times which an error has occurred in the hardware module; E) after step D), determining whether the error count value has reached the notification upper limit; F) after step E), in response to determining that the error count value has not reached the notification upper limit, returning to step A); and G) after step E), in response to determining that the error count value has reached the notification upper limit, sending the error event data that is related to the correctable error to the BMC, setting the error count value to zero, and returning to step A).

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

FIG. 3 is a schematic view illustrating a system event log for recording error event data according to an embodiment of the disclosure.

DETAILED DESCRIPTION

Figure 1:
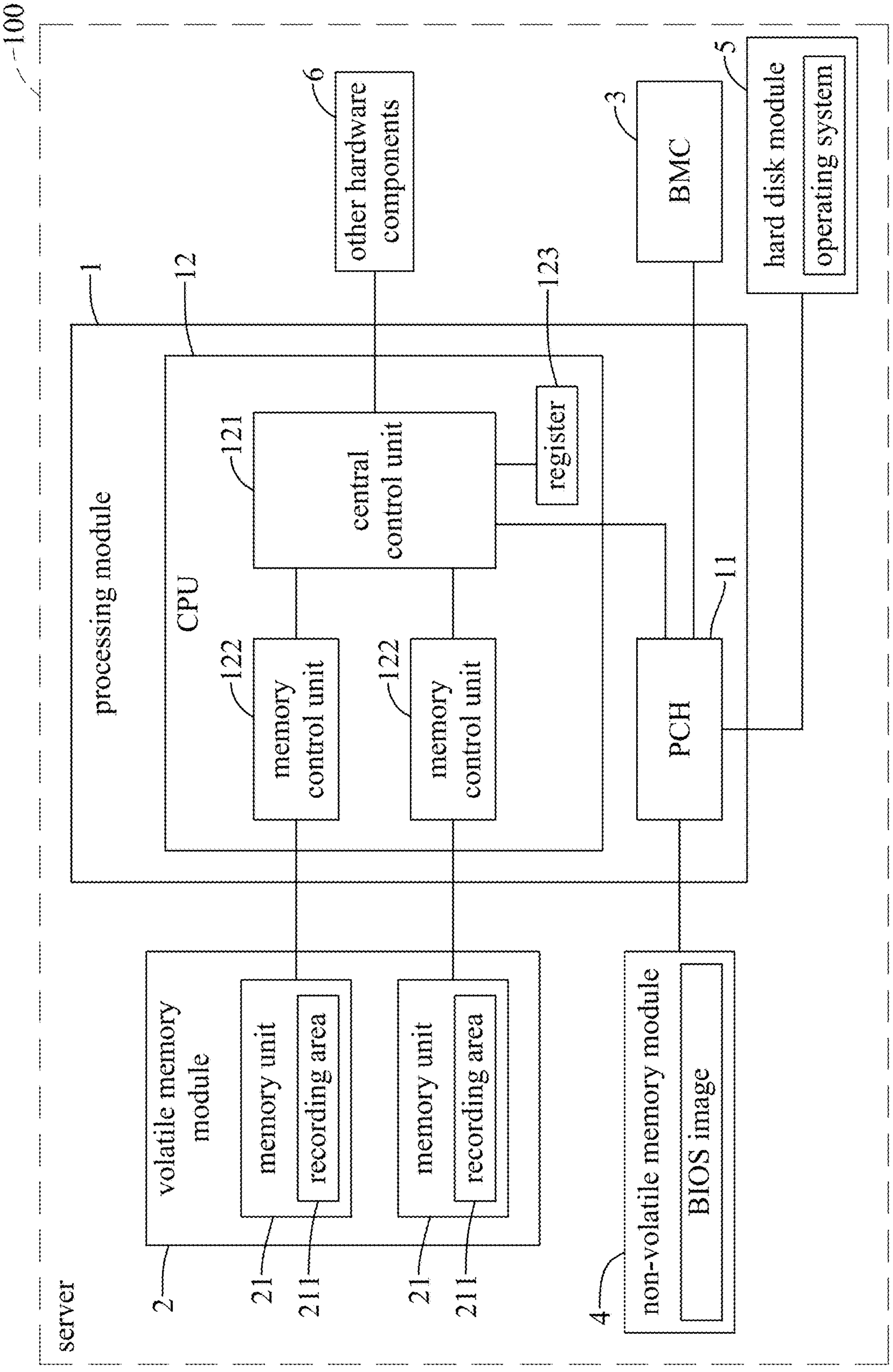
FIG. 1 is a block diagram illustrating a server according to an embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIG. 1, according to an embodiment of the disclosure, a method of recording error event is implemented by a processing module 1 included in a server 100. The server 100 further includes a volatile memory module 2, a baseboard management controller (BMC) 3, a non-volatile memory module 4, a hard disk module 5 and at least one other hardware component 6, where the volatile memory module 2, the BMC 3, the non-volatile memory module 4, the hard disk module 5 and the at least one other hardware component 6 are electrically connected to the processing module 1.

The processing module 1 includes a platform controller hub (PCH) 11, and a central processing unit (CPU) 12 that is electrically connected to the PCH 11. In some embodiments, the processing module 1 may be a system on chip (SoC) that incorporates both of the PCH 11 and the CPU 12. In some embodiments, the processing module 1 may be implemented as the CPU 12 in conjunction with the PCH 11 (i.e., the CPU 12 and the PCH 11 are separate components).

The CPU 12 includes a central control unit 121, a plurality of memory control units 122 that are electrically connected to the central control unit 121, and a register 123 that is electrically connected to the central control unit 121.

The processing module 1 is electrically connected to a hardware module, which may be any type of hardware where the central control unit 121 is able to detect an error event that occurs in the hardware module. For example, the hardware module may be the volatile memory module 2, or may be a peripheral component interconnect express (PCIe) device, but the disclosure is not limited to such.

The volatile memory module 2 includes a plurality of memory units 21, each of which includes a recording area 211 that is configured to record error event data. The memory control units 122 are electrically connected to the memory units 21, respectively. In this embodiment, the hardware module is exemplified by one of the memory units 21 of the volatile memory module 2. In some embodiments, the hardware module may be any one of the at least one other hardware component 6. In this embodiment, each of the memory units 21 is a dual in-line memory module (DIMM), but the disclosure is not limited to such.

In the following description, since the memory control units 122 operate in the same manner, only one of the memory control units 122, and a corresponding one of the memory units 21 that is electrically connected to the one of the memory control units 122 are described in detail for simplicity. In this embodiment, the memory control unit 122 is configured to, when receiving data from the memory unit 21 or storing data into the memory unit 21, detect whether an error event has occurred in the memory unit 21, and when detecting that an error event has occurred, generate and send an error signal (e.g., an interrupt signal) that is related to the error event occurred in the memory unit 21 to the central control unit 121. The central control unit 121 is configured to, when determining that an error event has occurred in the memory unit 21 (i.e., when receiving the error signal from the memory control unit 122), generate error event data that is related to the error event. Specifically, an error type of the error event is either a correctable error or an uncorrectable error.

The BMC 3 is electrically connected to the PCH 11. It should be noted that the central control unit 121 is further configured to, after receiving the error signal from the memory control unit 122, determine whether the error type of the error event is a correctable error or an uncorrectable error based on the error signal, and perform the method of recording error event according to an embodiment of this disclosure, so as to decide whether to send the error event data to the BMC 3 through the PCH 11. Furthermore, in response to receipt of the error event data from the central control unit 121, the BMC 3 may record the error event data in a system event log.

The non-volatile memory module 4 stores a basic input/output system (BIOS) image, which may be executed to run a BIOS. Specifically, the BIOS image has a plurality of preset values including a first threshold and a second threshold that are related to an error frequency, and a default value and an alternative value that are related to a notification upper limit. When the central control unit 121 runs the BIOS, the central control unit 121 obtains the preset values and then stores the preset values thus obtained in either the memory control units 122 or the register 123 of the processing module 1. It should be noted that a system manager of the server 100 may modify the preset values in the BIOS through BIOS setting menu according to user needs.

The hard disk module 5 stores an operating system. It should be noted that the central control unit 121 first reads and executes, through the PCH 11, the BIOS image stored in the non-volatile memory module 4 so as to run the BIOS and obtain the preset values, and then reads and executes, through the PCH 11, the operating system stored in the hard disk module 5. The method of recording error event may be performed while the central control unit 121 is executing either the BIOS image or the operating system.

Figure 2A:
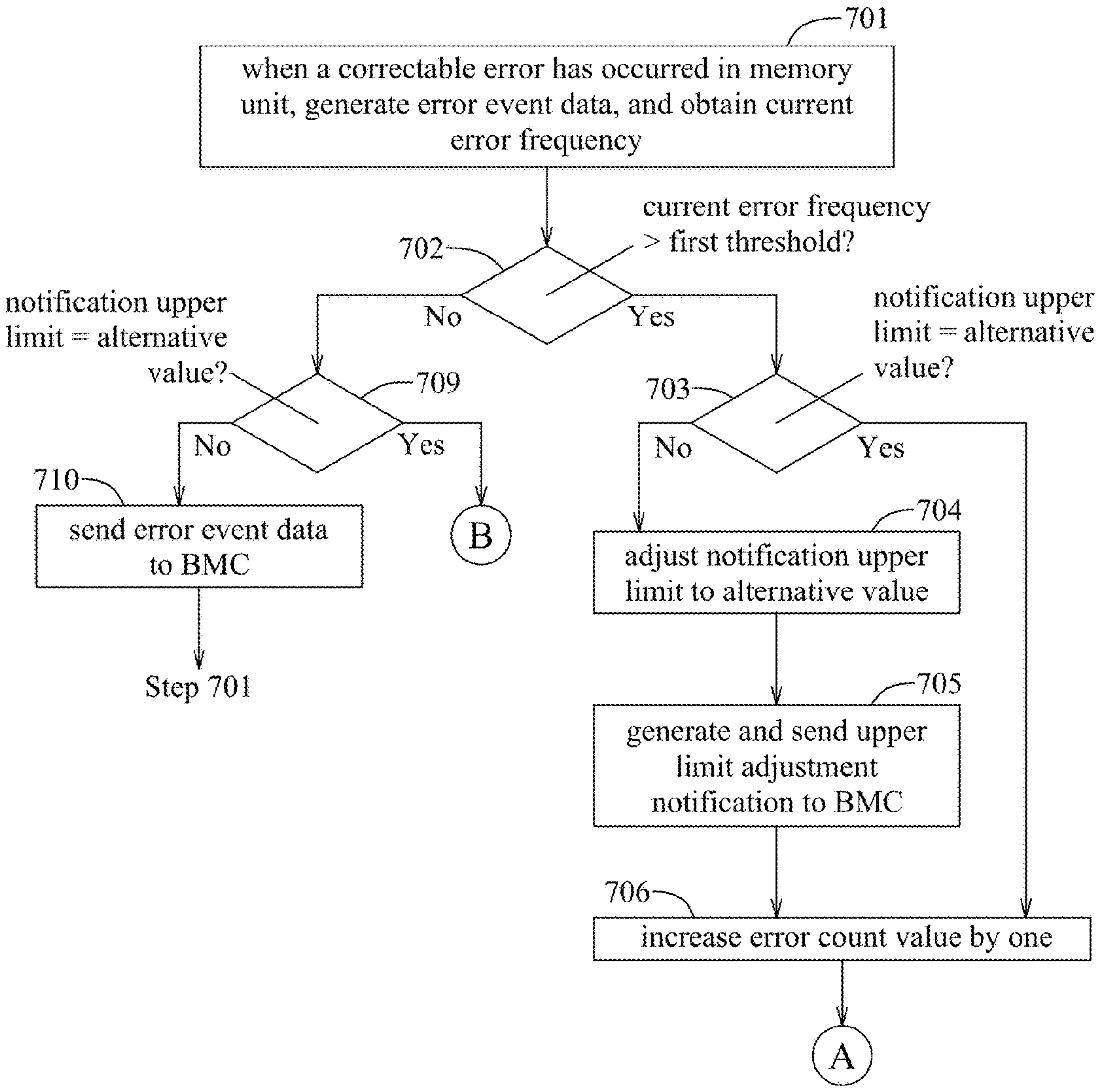
FIGS. 2A to 2C cooperatively show a flow chart illustrating a method of recording error event.
Figure 2B:
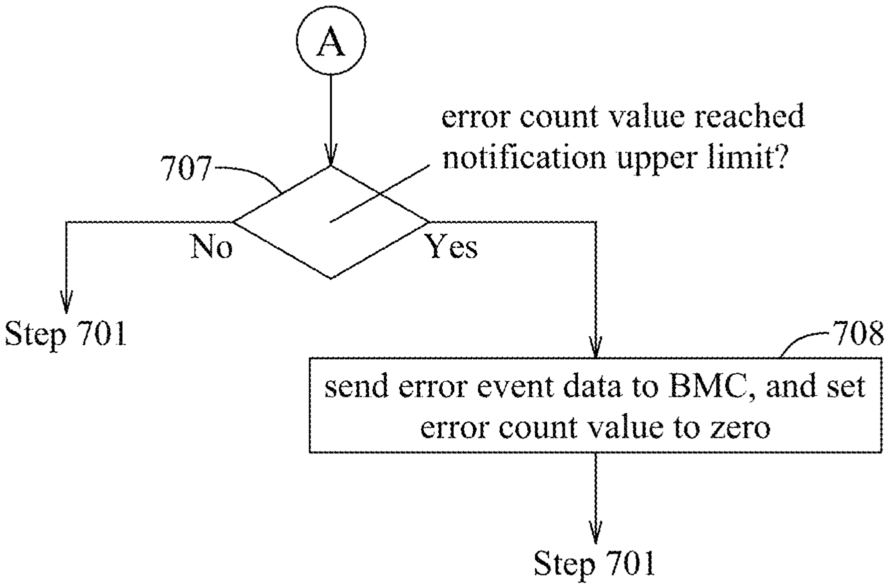
Figure 2C:
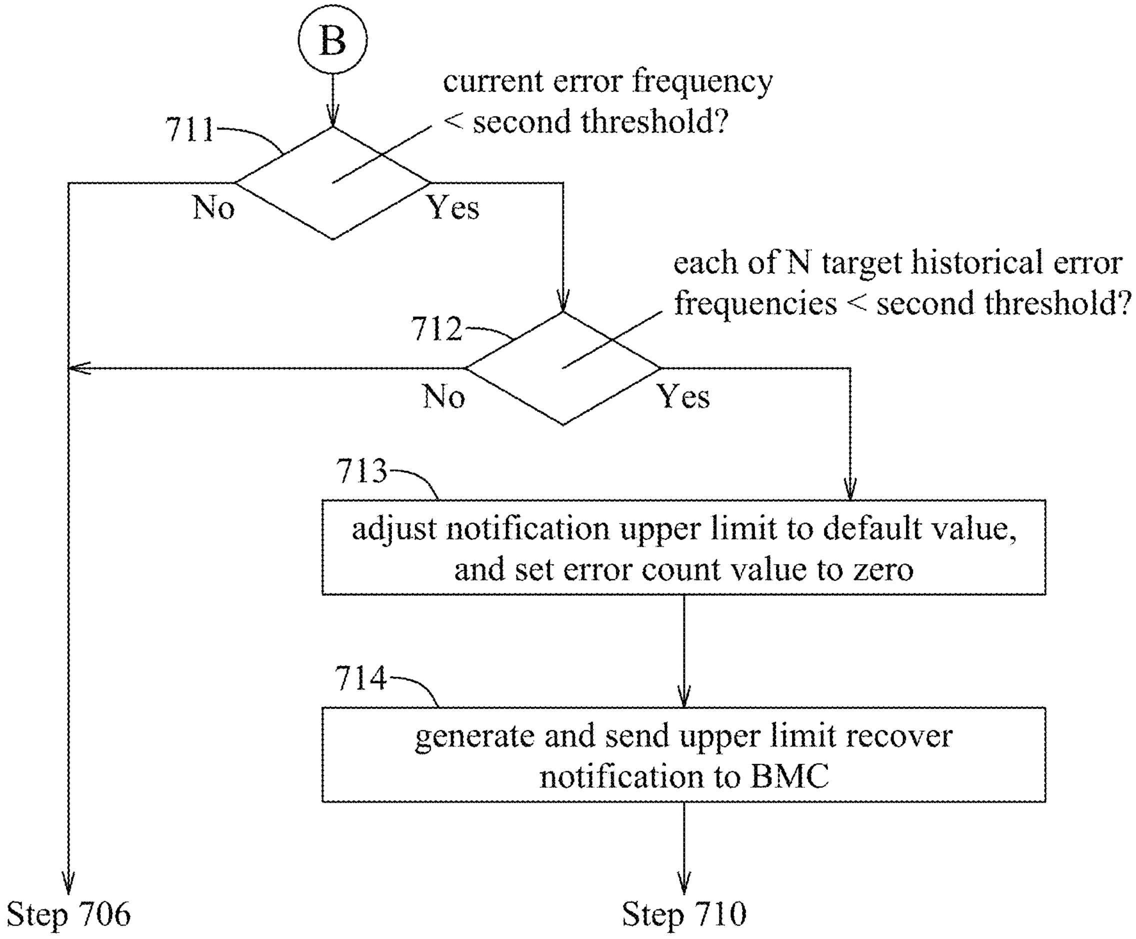

Referring further to FIGS. 2A to 2C, the following describes operations of the processing module 1, the volatile memory module 2, the BMC 3, the non-volatile memory module 4 and the hard disk module 5 in the method of recording error event according to an embodiment of the disclosure. In this embodiment, the method includes steps 701 to 714. It should be noted that, since the method is implemented for each of the memory units 21, only one of the memory units 21 and the corresponding one of the memory control units 122 will be described in detail in the following.

In step 701, when the central control unit 121 determines that a correctable error has occurred in the memory unit 21 (i.e., the hardware module) through the corresponding one of the memory control units 122, the central control unit 121 generates error event data that is related to the correctable error, and obtains a current error frequency that is related to occurrence of the correctable error in the memory unit 21. Then, the central control unit 121 records the current error frequency as one of a number M of historical error frequency(ies) in a chronological order, where M is an integer that is greater than or equal to one. That is to say, the current error frequency is added to a number (M−1) of historical error frequency(ies) that was previously recorded, thereby making the current error frequency a last one of the number M of historical error frequency(ies) in the chronological order.

It should be noted that, when the corresponding one of the memory control units 122 detects the correctable error in the memory unit 21, the corresponding one of the memory control units 122 generates and sends the error signal that is related to the correctable error to the central control unit 121, so that the central control unit 121 determines that a correctable error has occurred in the memory unit 21 and thus generates and stores the error event data that is related to the correctable error in the register 123. The central control unit 121 then determines whether to send the error event data to the BMC 3.

It should be further noted that, in this embodiment, the error event data includes a device number of the central control unit 121, a device number of the corresponding one of the memory control units 122, a channel number of the non-volatile memory module 4, and a time point at which the correctable error occurred (i.e., a timestamp), but the disclosure is not limited to such. In this embodiment, the central control unit 121 calculates the current error frequency based on a number of times of the occurrence of the correctable error in the memory unit 21 within a fixed period of time, but the disclosure is not limited to such. In one example, assuming that the fixed period of time is 5 seconds, the current error frequency may be calculated by dividing the number of times of the occurrence of the correctable error in the memory unit 21 within 5 seconds (e.g., 6 times) by the fixed period of time (e.g., 5 seconds). That is to say, 6/5=1.2 times per second.

In step 702, the central control unit 121 determines whether the current error frequency is greater than the first threshold. If the determination is affirmative, the flow proceeds to step 703; otherwise, the flow proceeds to step 709.

In step 703, the central control unit 121 determines whether the notification upper limit has been set to the alternative value. When the central control unit 121 determines that the notification upper limit has not been set to the alternative value (i.e., the notification upper limit is equal to the default value), the flow proceeds to step 704; otherwise, the flow proceeds to step 706. It should be noted that the alternative value is greater than the default value. In one example, the default value is set to one, and the alternative value is set to ten, but the disclosure is not limited to such.

In step 704, the central control unit 121 adjusts the notification upper limit that corresponds to the memory unit 21 from the default value to the alternative value.

In step 705, the central control unit 121 generates an upper limit adjustment notification (e.g., "reporting per 10 errors" as exemplified in FIG. 3) indicating that the notification upper limit has been adjusted from the default value to the alternative value, and sends the upper limit adjustment notification to the BMC 3 through the PCH 11, so that the BMC 3 records the upper limit adjustment notification in the system event log.

In step 706, the central control unit 121 increases an error count value by one, where the error count value indicates a number of times which an error has occurred in the memory unit 21. It should be noted that the error count value is set to be zero initially.

In step 707, the central control unit 121 determines whether the error count value has reached the notification upper limit (which is equal to the alternative value at this time). When the central control unit 121 determines that the error count value has not reached the notification upper limit, the flow goes back to step 701; otherwise, the flow proceeds to step 708.

In step 708, the central control unit 121 sends the error event data that is related to the correctable error and that is stored in the register 123 to the BMC 3 through the PCH 11, and sets the error count value to zero. When the BMC 3 receives the error event data that is related to the correctable error, the BMC 3 records the error event data in the system event log. Then, the flow goes back to step 701.

That is to say, when step 708 is executed, the error event data stored in the register 123 is, for example, the $10^{th}$ (i.e., the alternative value) error event data generated after the previous error event data which is recorded on the system event log. As such, the system manager of the server 100 may realize that each error event data (e.g., "correctable error detected in hardware" as exemplified in FIG. 3) appeared after the "reporting per 10 errors" in the system event log indicates that ten correctable errors had occurred in the hardware module (i.e., the memory unit 21). It should be noted that, in this embodiment, the central control unit 121 further stores the error event data that is related to the correctable error into the recording area 211 of the memory unit 21 of the volatile memory module 2.

In one example, when the central control unit 121 determines, in step 702, that the current error frequency (e.g., 12 times per second) is greater than the first threshold (e.g., 10 times per second), the central control unit 121 first determines whether the notification upper limit has been set to the alternative value (step 703), and when the central control unit 121 determines that the notification upper limit has not been set to the alternative value, the central control unit 121 adjusts the notification upper limit that corresponds to the memory unit 21 from the default value to the alternative value (step 704), and generates and sends the upper limit adjustment notification (e.g., "reporting per 10 errors") to the BMC 3 (step 705), so that the BMC 3 records the upper limit adjustment notification in the system event log. Then, the central control unit 121 increases the error count value by one (step 706), and determines whether the error count value has reached the notification upper limit (e.g., 10 times) (step 707). Only when the central control unit 121 determines that the error count value has reached the notification upper limit will the central control unit 121 send the error event data to the BMC 3 and set the error count value to zero (step 708), so that the BMC 3 records the error event data in the system event log. As such, the impact on the performance of the server 100 may be reduced.

When the central control unit 121 determines, in step 702, that the current error frequency is not greater than the first threshold, the flow proceeds to step 709, where the central control unit 121 determines whether the notification upper limit has been set to the alternative value. When the central control unit 121 determines that the notification upper limit has not been set to the alternative value (i.e., the notification upper limit is equal to the default value), the flow proceeds to step 710; otherwise, the flow proceeds to step 711.

In step 710, the central control unit 121 sends the error event data that is related to the correctable error and that is stored in the register 123 to the BMC 3 through the PCH 11. When the BMC 3 receives the error event data that is related to the correctable error, the BMC 3 records the error event data in the system event log. Then, the flow goes back to step 701. It should be noted that, in this embodiment, the central control unit 121 further stores the error event data that is related to the correctable error into the recording area 211 of the memory unit 21 of the volatile memory module 2.

When the central control unit 121 determines, in step 709, that the notification upper limit has been set to the alternative value, the flow proceeds to step 711, where the central control unit 121 determines whether the current error frequency is less than the second threshold. When the central control unit 121 determines that the current error frequency is not less than the second threshold, the flow proceeds to step 706; otherwise, the flow proceeds to step 712. It should be noted that the first threshold is greater than the second threshold.

In step 712, the central control unit 121 determines whether each of a number N of target historical error frequencies among the number M of historical error frequencies is less than the second threshold. When the determination is negative, the flow proceeds to step 706; otherwise, the flow proceeds to step 713. It should be noted that the number N of target historical error frequencies are N historical error frequencies that are successively last recorded by the central control unit 121 among the number M of historical error frequencies, and include the current error frequency, where N is an integer that is greater than or equal to two.

It should be noted that, in some embodiments, when the central control unit 121 determines, in step 711, that the current error frequency is less than the second threshold, step 712 may be omitted, and the flow directly proceeds to step 713. In some embodiments, when the central control unit 121 determines, in step 709, that the notification upper limit has been set to the alternative value, step 711 may be omitted, and the flow directly proceeds to step 712.

In step 713, the central control unit 121 adjusts the notification upper limit that corresponds to the memory unit 21 to the default value, and sets the error count value to zero.

In step 714, the central control unit 121 generates an upper limit recover notification (e.g., "reporting per 1 error" as exemplified in FIG. 3) indicating that the notification upper limit has been reset back to the default value, and sends the upper limit recover notification to the BMC 3 through the PCH 11, so that the BMC 3 records the upper limit recover notification in the system event log. Then, the flow proceeds to step 710.

In one example, when the central control unit 121 determines, in step 702, that the current error frequency (e.g., 2 times per second) is not greater than the first threshold (e.g., 10 times per second), the central control unit 121 first determines whether the notification upper limit has been set to the alternative value (step 709), and when the central control unit 121 determines that the notification upper limit has been set to the alternative value, the central control unit 121 then determines whether the current error frequency (e.g., 2 times per second) is less than the second threshold (e.g., 3 times per second) (step 711). When the central control unit 121 determines that the current error frequency is less than the second threshold, the central control unit 121 adjusts the notification upper limit to the default value and sets the error count value to zero (step 713), and sends the upper limit recover information (e.g., "reporting per 1 error") to the BMC 3 (step 714), so that the BMC 3 records the upper limit recover notification in the system event log.

In summary, according to the disclosure, when determining that a correctable error has occurred in the hardware module (i.e., the memory unit 21 of the volatile memory module 2), the central control unit 121 obtains the current error frequency. When determining that the current error frequency is greater than the first threshold such that the server 100 may have a degraded performance or even a crash, the central control unit 121 adjusts the notification upper limit from the default value (e.g., 1) to the alternative value (e.g., 10), so that a frequency of the central control unit 121 sending the error event data to the BMC 3 is reduced. That is to say, the error event data is sent to the BMC 3 only when 10 correctable errors had occurred (i.e., when the notification upper limit has been reached). Moreover, when determining that the current error frequency is less than the second threshold such that the performance of the server 100 is less likely to be impacted, the central control unit 121 adjusts the notification upper limit back to the default value (e.g., 1), so that the BMC 3 records the error event data in the system event log for every correctable error that occurred in the hardware module, instead of recording the error event data per 10 correctable errors. As such, when a large number of correctable errors are detected in the hardware module, the frequency of the BMC 3 receiving the error event data is reduced, thereby reducing the computational load of the server 100 and thus preventing the server 100 from crashing. At the same time, the BMC 3 is still able to record the error event data in the system event log so that the error event data may be reviewed later.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method of recording an error event implemented by a processing module, the processing module being electrically connected to a hardware module and a baseboard management controller (BMC), the method comprising steps of:

A) in response to determining that a correctable error has occurred in the hardware module, obtaining a current error frequency related to occurrence of the correctable error in the hardware module, and generating error event data that is related to the correctable error;

B) after step A), determining whether the current error frequency is greater than a first threshold;

C) after step B), in response to determining that the current error frequency is greater than the first threshold, adjusting a notification upper limit that corresponds to the hardware module from a default value to an alternative value, where the alternative value is greater than the default value;

D) after step C), increasing an error count value by one, where the error count value indicates a number of times which an error has occurred in the hardware module;

E) after step D), determining whether the error count value has reached the notification upper limit;

F) after step E), in response to determining that the error count value has not reached the notification upper limit, returning to step A);

G) after step E), in response to determining that the error count value has reached the notification upper limit, sending the error event data that is related to the correctable error to the BMC, setting the error count value to zero, and returning to step A);

J) after step B), in response to determining that the current error frequency is not greater than the first threshold, determining whether the notification upper limit has been set to the alternative value;

K) after step B), in response to determining that the current error frequency is not greater than the first threshold and that the notification upper limit has been set to the alternative value, determining whether the current error frequency is less than a second threshold, where the first threshold is greater than the second threshold; and L) after step B), in response to determining that the current error frequency is not greater than the first threshold, that the notification upper limit has been set to the alternative value, and that the current error frequency is less than the second threshold, adjusting the notification upper limit that corresponds to the hardware module to the default value, and setting the error count value to zero.

2. The method as claimed in claim 1, wherein step C) further includes generating and sending an upper limit adjustment notification to the BMC after adjusting the notification upper limit from the default value to the alternative value, where the upper limit adjustment notification indicates that the notification upper limit has been adjusted from the default value to the alternative value.

3. The method as claimed in claim 2, further comprising, between step B) and step C), a step H) of, in response to determining that the current error frequency is greater than the first threshold, determining whether the notification upper limit has been set to the alternative value, wherein in step C), the notification upper limit is adjusted from the default value to the alternative value in response to determining that the current error frequency is greater than the first threshold, and that the notification upper limit has not been set to the alternative value.

4. The method as claimed in claim 3, wherein step D) is implemented in response to determining that the current error frequency is greater than the first threshold and that the notification upper limit has been set to the alternative value.

5. The method as claimed in claim 1, further comprising, after step L), a step of generating and sending an upper limit recover notification to the BMC, where the upper limit recover notification indicates that the notification upper limit has been reset back to the default value.

6. The method as claimed in claim 1, wherein in step A), the current error frequency is recorded as one of a plurality of historical error frequencies in a chronological order, the method further comprising, between step K) and step L), a step M) of, in response to determining that the current error frequency is not greater than the first threshold, that the notification upper limit has been set to the alternative value, and that the current error frequency is less than the second threshold, determining whether each of a number N of target historical error frequencies among the historical error frequencies is less than the second threshold, where the number N of target historical error frequencies are successively last recorded and include the current error frequency, and Nis an integer greater than or equal to two, wherein step L) is implemented in response to determining that the current error frequency is not greater than the first threshold, that the notification upper limit has been set to the alternative value, that the current error frequency is less than the second threshold, and that each of the number N of target historical error frequencies is less than the second threshold.

7. The method as claimed in claim 6, wherein step D) is implemented in response to determining that at least one of the number N of target historical error frequencies is not less than the second threshold.

8. The method as claimed in claim 1, further comprising, after step L), a step of sending the error event data that is related to the correctable error to the BMC, and returning to step A).

9. The method as claimed in claim 1, further comprising, after step J), a step of, in response to determining that the current error frequency is not greater than the first threshold and that the notification upper limit has not been set to the alternative value, sending the error event data that is related to the correctable error to the BMC, and returning to step A).

10. The method as claimed in claim 1, wherein step D) is implemented in response to determining that the current error frequency is not greater than the first threshold, that the notification upper limit has been set to the alternative value, and that the current error frequency is not less than the second threshold.

11. The method as claimed in claim 1, further comprising a step of, in response to determining that the correctable error has occurred in the hardware module, storing a time point at which the correctable error occurred, wherein the error event data includes the time point.

12. The method as claimed in claim 11, wherein, in step A), the current error frequency is calculated based on a number of times of the occurrence of the correctable error in the hardware module within a fixed period of time based on the time point at which the correctable error occurred.

* * * * *